Patented Aug. 31, 1948

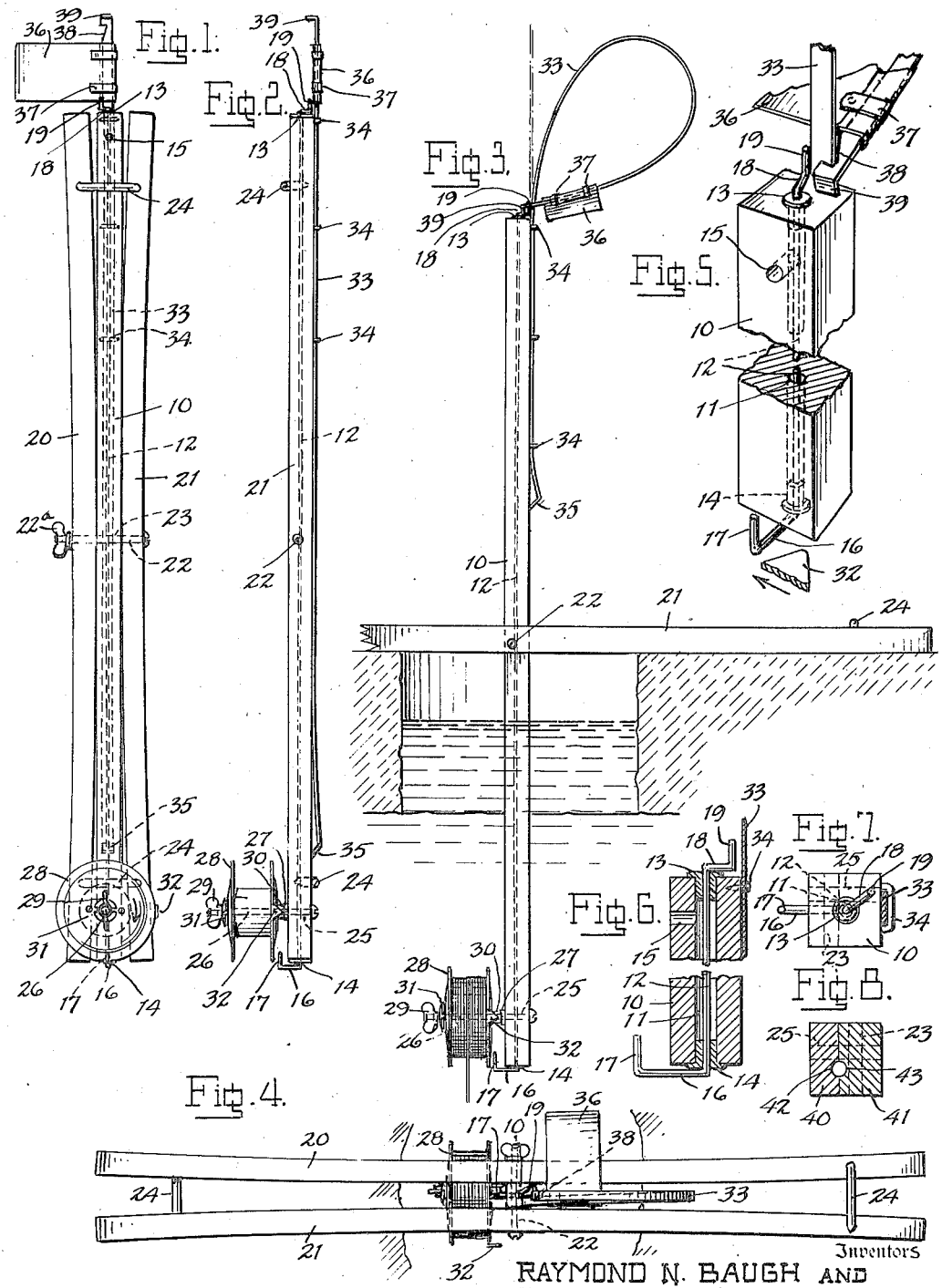

2,448,346

UNITED STATES PATENT OFFICE 2,448,346

TIPUP FOR ICE FISHING

Raymond N. Baugh, Bridgeport, and Robert F. Wycinowski, Fairfield, Conn.

Application December 2, 1946, Serial No. 713,496

9 Claims. (Cl. 43—17)

1

The present invention relates to a tip-up for ice fishing and has for an object to provide a device of this character wherein a fish line carrying reel is adapted to be suspended through a hole in the ice below the surface of the water, and which includes signal means supported in elevated position above the ice adapted to be released, through rotation of the reel, for the purpose of signaling the fisherman. It is particularly proposed to provide a tip-up in which the actuating means between the reel and the signal is in the form of a rotatable crank rod having crank arms at each end, its longitudinal shaft portion being sealed within a tubular supporting member to the end that the crank member is effectually protected against freezing and is adapted to be operated with a minimum of force applied to a crank portion at one end, it being pointed out that any tip-up device which requires appreciable force to operate it will scare off a fish which starts to take the hook.

Another object is to provide a signal device in the form of a spring strip member adapted in its set position to be formed into a loop by engaging a notched end thereof directly with the spring strip member itself adjacent the upper end of the supporting member, so that a minimum force will be required to release it, as distinguished from other types of tip-ups employing latches, slots, and other such structures provided upon the upper end of the supporting member, and which offer substantial resistance to releasing.

It is further proposed to provide flag means secured to the end of the spring strip member, and fixed in a predetermined position so that it normally extends from the spring strip member in the same direction as the direction of engagement of the notched end of the spring strip member in setting it, so that the tip-up may be placed in a position with the flag disposed in windward direction, and thus the force of the wind will tend to retain the signal in its set position and will not accidentally disengage it.

A further object is to provide a foldable tip-up structure, including a bridging member for bridging a hole in the ice and a reel supporting member pivotally connected thereto, it being particularly proposed to provide such members which may be compactly folded, and which when in the folded position will not tend to freeze together, particularly when one of the members is wet. To this end it is proposed to provide a bridging member in the form of a pair of strips provided at each side of the reel supporting member, these

2 strips being spread outwardly at each end of the bridging member so that spaces are provided in which ice can not form, the arrangement furthermore providing firm support for the tip-up when it is engaged upon the ice.

With the above and other objects in view, an embodiment of the invention is shown in the accompanying drawing, and this embodiment will be hereinafter more fully described with reference thereto, and the invention will be finally pointed out in the claims.

In the drawings:

Fig. 1 is a front elevation of the tip-up in its folded position, the spring strip signal member being in its retracted position.

Fig. 2 is a side elevation thereof.

Fig. 3 is a side elevation showing the tip-up in its operative position supported through a hole in the ice, the signal member being shown in full lines in its set position, and in dot-and-dash lines in its released position.

Fig. 4 is a plan view thereof.

Fig. 5 is an enlarged perspective view, with intermediate parts broken away, showing the upper and lower ends of the reel supporting member, and showing the spring strip signal member engaged with itself in its set position.

Fig. 6 is an enlarged, detail, vertical, sectional view of the reel supporting member, with the intermediate portions being broken away.

Fig. 7 is a top plan view thereof.

Fig. 8 is a transverse sectional view of a modified form of a reel supporting member, constructed of two strips of material secured together.

Similar reference characters indicate corresponding parts throughout the several figures of the drawing.

Referring to the drawing, the tip-up, according to the illustrated exemplary embodiment of the invention, comprises an elongated reel supporting member 10 preferably constructed of wood, which may be impregnated or otherwise suitably treated to render it water-resistant, and provided centrally with a passage 11 extending longitudinally therethrough. A rotary crank member 12 is engaged in the passage 11, being preferably of substantially smaller diameter than the passage and having rotary bearing at its upper and lower ends in flanged bearing bushings 13 and 14, which provide bearing supports in which the crank member may be rotated with a minimum of resistance, and at the same time seal the upper and lower ends of the passage 11. This passage is preferably filled with grease or other suitable non-freezing substance, which may be conveniently introduced therein through a hole 15 near the upper end of the reel supporting member.

The crank member is provided at its lower end with a horizontally extending crank arm 16 provided at its outer end with an upwardly extending finger 17, and at its upper end with a horizontally extending crank arm 18 provided at its outer end with an upwardly extending finger 19, the crank arms 16 and 17 having bearing engagement with the flanged ends of the bushings 13 and 14, out of engagement with the upper and lower ends of the member 10 so that the crank member is restricted against longitudinal movement, and at the same time may have rotary movement with a minimum of resistance.

The reel supporting member 10 is preferably of rectangular or square cross-section, and at each side thereof there are provided the two members 20 and 21 of the bridging member, these being also preferably constructed of wood of square or rectangular cross-section. These members are of equal length and are preferably of the same length as the member 10, being pivotally connected centrally to the member 10 by a pivot bolt 22 extending through a passage 23 in the member 10, which is offset from the longitudinal passage 11 therethrough, as clearly indicated in Fig. 7, the bolt having a wing nut 22ª screwed upon its end for clamping the members together in their folded position. This bolt holds the intermediate portions of the members 20 and 21 closely adjacent to the member 10, while the end portions of the members 20 and 21 are spread apart by means of cleats 24—24 so that these end portions are out of contact with the member 10, thus preventing the members from freezing together in their folded position. When engaged wtih the ice, as shown in Figs. 3 and 4, the bridging member provides relatively wide supporting surfaces for the tip-up to resist rocking due to the force of wind or water currents. The cleat members 24—24 are preferably in the form of relatively heavy wire staples having their ends driven into respective members 20 and 21, one cleat member being at one side while the other cleat member is at the other side, so that they form stops to align the member 10 with the bridge member in the folded position, as shown in Figs. 1 and 2, and permit the member 10 to be swung into its vertical operative position with respect to the bridge member, as shown in Fig. 3.

In upwardly spaced relation to the lower end of the reel supporting member 10, there is secured in a passage 25, offset from the longitudinal passage 11, as clearly shown in Fig. 7, a reel supporting shaft 26 having its head engaged at the rearward side of the member 10 and secured at the forward side by a nut 27. The shaft projects forwardly from the member 10, where the reel member 28 is rotatably mounted thereon and retained by a wing nut 29, the inner side of the reel member being outwardly spaced from the surface of the member 10 by a bushing 30. A cupped spring washer 31 is engaged between the reel and the wing nut, so that by adjustment of the latter tension on the reel may be varied, as desired. Through the upward spacing of the shaft from the lower end of the member 10 the periphery of the reel is disposed substantially in line with the lower end of the member 10, being provided with an inwardly extending lug 32 in the path of which is normally disposed the upwardly extending finger 17 of the crank arm 16, this finger 17 extending upwardly within the space between the member 10 and the reel. Thus, as the reel is rotated in the normal unwinding direction, indicated by the arrow in Fig. 1, the lug 32 contacts the finger 17 and rotates the crank member to cause the crank arm 18 at its upper end to be rotated for the purpose of releasing the signal device, as will presently more fully appear. This action will take place with a minimum of resistance, the crank arm 16 thereupon remaining out of the path of the lug 32, so that there is no interference with the rotation of the reel.

The signal member is in the form of an elongated strip of steel or other suitable spring material 33, slidably mounted upon the opposed side of the member 10 from the reel by means of a series of metal staples 34 at the upper portion of the member 10, the uppermost staple being preferably contiguous to its upper end. The lower end of the strip 33 is provided with an inwardly bent extremity 35 for engaging against the side of the member 10 to frictionally retain the position of adjustment of the strip 10 and to limit its extended position, as shown in Fig. 3. Adjacent the upper end portion of the strip there is secured a signal flag 36 which may be of flannel or other suitable material, and which is clamped about the strip by means of metal clips 37. Beyond the upper edge of the flag the end portion of the strip is provided with a notch 38 disposed at the edge of the strip toward the direction in which the flag 36 is extended from the strip, and at the extreme end of the strip beyond the notch there is provided a right angularly bent lip 39.

In order to set the signal it is first extended into its operative position, as shown in Fig. 3, and then bent downwardly and forwardly in the form of a loop, the notch 38 being engaged with the strip member at its side opposed to the direction in which the flag extends, with the lip engaging the upper end of the member 10. In this position the end portion of the strip adjacent the notch is raised from the upper end of the member 10 and is directly in the path of movement of the finger 19 of the crank arm 18 when the latter is actuated through rotation of the reel, as above pointed out. The flag being in a fixed direction with respect to the direction of engagement of the notch with the strip member permits the tip-up to be placed with the flag to windward, so that there is no likelihood of the signal being accidentally released by the force of the wind. At the same time, it is very easy to engage the signal device in its set position simply by engaging the edge of the notched side with the edge of the strip and without requiring exact engagement with latches, slots, or other such means, as is necessary with other types of tip-ups. This is especially important in such a sport as ice fishing, where a fisherman usually has gloves on. Upon rotation of the crank member through movement of the reel the finger 19 engages the end of the strip member and moves the notch out of engagement with the portion of the strip member engaged thereby, the strip member then springing to its vertical signaling position, as shown by the dot-and-dash lines of Fig. 3.

In Fig. 8, there is illustrated a modified form of reel supporting member constructed of two strips 40 and 41, of wood or other suitable material, cemented, nailed or otherwise suitably secured together, and respectively provided with registering longitudinal semi-cylindrical grooves 42 and 43, which form a cylindrical longitudinal passage therethrough for the crank member. The strips are of unequal thicknesses, and the grooves are offset from the center, so that the respective passages 23 and 25, for receiving the pivot bolt 22 and the reel supporting shaft 26, are substantially closer to the central lines of the reel supporting member than is the case where the crank shaft passage is centrally of the reel supporting member, as in the first embodiment. Obviously, the two-piece structure may have the crank shaft passage centrally disposed, if desired.

We have illustrated and described a preferred and satisfactory embodiment of the invention, but it will be understood that changes may be made therein, within the spirit and scope thereof, as defined in the appended claims.

What is claimed is:

1. In a tip-up for ice fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member, a signal carrying spring strip member carried upon the upper portion of said reel supporting member and adapted to extend substantially above it, said strip member having in one edge a notch adapted upon forming said strip member into a loop to be engaged with the other edge of said strip member at an intermediate point thereof contiguous to the upper end of said reel supporting member, operating means carried by said reel supporting member for effecting disengagement of said notch of said strip member from its intermediate portion, and means carried by said reel arranged to actuate said operating means upon rotation of said reel.

2. In a tip-up for ice fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member, a signal carrying spring strip member carried upon the upper portion of said reel supporting member and adapted to extend substantially above it, said strip member having in one edge and contiguous to its upper end a notch adapted upon forming said strip member into a loop to be engaged with the other edge of said strip member at an intermediate point thereof contiguous to the upper end of said reel supporting member, and having at its upper end a lip adapted in said looped position to extend downwardly into engagement with the upper end of said reel supporting member, operating means carried by said reel supporting member for effecting disengagement of said notch of said strip member from its intermediate portion, and means carried by said reel arranged to actuate said operating means upon rotation of said reel.

3. In a tip-up for ice fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member, a signal carrying spring strip member slidably mounted upon a side of said reel supporting member for movement between retracted and extended positions and adapted in extended position to extend substantially above said reel supporting member, said strip member having in one edge a notch adapted upon forming said strip member into a loop to be engaged with the other edge of said strip member at an intermediate point thereof contiguous to the upper end of said reel supporting member, operating means carried by said reel supporting member for effecting disengagement of said notch of said strip member from its intermediate portion, and means carried by said reel arranged to actuate said operating means upon rotation of said reel.

4. In a tip-up for ice fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member, a signal carrying spring strip member carried upon the upper portion of said reel supporting member and adapted to extend substantially above it, said strip member having in one edge a notch adapted upon forming said strip member into a loop to be engaged with the other edge of said strip member at an interemediate point thereof contiguous to the upper end of said reel supporting member, a signal flag secured to said strip member contiguous to said notch and extending from said strip member in the direction of engagement of said notch with said intermediate portion, operating means carried by said reel supporting member for effecting disengagement of said notch of said strip member from its intermediate portion, and means carried by said reel arranged to actuate said operating means upon rotation of said reel.

5. In a tip-up for ice fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member, a signal carrying spring strip member carried upon the upper portion of said reel supporting member and adapted to extend substantially above it, said strip member having in one edge a notch adapted upon forming said strip member into a loop to be engaged with the other edge of said strip member at an intermediate point thereof contiguous to the upper end of said reel supporting member, said reel supporting member having a longitudinal passage extending therethrough, a crank shaft rotatably engaged in said passage having at its lower end an outwardly extending crank arm and having at its upper end an outwardly extending crank arm, a portion of said strip member in its looped position being in the path of movement of said upper crank arm whereby upon rotation of said crank shaft in one direction said notch of said strip member is disengaged from its intermediate portion, and a projecting lug carried by said reel adapted upon rotation of said reel to engage said lower crank arm of said crank shaft to rotate the latter.

6. In a tip-up for ice fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member with its axis in upwardly spaced relation to the lower end thereof, a signal carrying spring strip member carried upon the upper portion of said reel supporting member and adapted to extend substantially above it, said strip member having in one edge a notch adapted upon forming said strip member into a loop to be engaged with the other edge of said strip member at an intermediate point thereof contiguous to the upper end of said reel supporting member, said reel supporting member having a longitudinal passage extending therethrough, a crank shaft rotatably engaged in said passage having at its lower end an outwardly extending crank arm, and having at its upper end an outwardly extending crank arm, a portion of said strip member in its looped position being in the path of movement of said upper crank arm whereby upon rotation in one direction of said crank shaft said notch of said strip member is disengaged from its intermediate portion, and a projecting lug carried at the periphery of said reel adapted upon rotation of said reel to engage said lower crank arm of said crank shaft to rotate the latter.

7. In a tip-up for ice fishing, a reel supporting member, a bridging member for resting upon the surface of the ice and bridging a hole therein, comprising a pair of side members disposed at opposed sides of said reel supporting member, a bolt pivotally connecting said side members substantially centrally to said reel supporting member, cleat means contiguous to the ends of said strip members and respectively disposed at opposed sides of said side members, said reel supporting member in a folded position adapted to lie in parallel relation between said side members and in open position to extend substantially vertically above and below it, a reel rotatably mounted upon the lower portion of said reel supporting member, releasable signal means carried upon the upper portion of said reel supporting member, operating means carried by said reel supporting member for effecting release of said signal means, and means carried by said reel arranged to actuate said operating means upon rotation of said reel.

8. In a tip-up for ice fishing, a reel supporting member, a bridging member for resting upon the surface of the ice and bridging a hole therein, comprising a pair of side members disposed at opposed sides of said reel supporting member, a bolt pivotally connecting said side members substantially centrally to said reel supporting member, cleat means contiguous to the ends of said strip members and respectively disposed at opposed sides of said side members, said side members diverging outwardly with respect to each other from their intermediate portions to their respective ends, said reel supporting member in a folded position adapted to lie in parallel relation between said side members and in open position to extend substantially vertically above and below it, a reel rotatably mounted upon the lower portion of said reel supporting member, releasable signal means carried upon the upper portion of said reel supporting member, operating means carried by said reel supporting member for effecting release of said signal means, and means carried by said reel arranged to actuate said operating means upon rotation of said reel.

9. In a tip-up for ice-fishing, a bridging member for resting upon the surface of the ice and bridging a hole therein, a reel supporting member pivotally connected to said bridging member and adapted to extend substantially vertically above and below it, a reel rotatably mounted upon the lower portion of said reel supporting member, a signal carrying spring strip member carried upon the upper portion of said reel supporting member and adapted to extend substantially above it, said strip member having in one edge contiguous to its upper end a notch adapted upon forming said strip member into a loop to be engaged with the other edge of said strip member at an intermediate point thereof contiguous to the upper end of said reel supporting member, and having at its upper end a lip adapted in said looped position to extend downwardly into engagement with the upper end of said reel supporting member, said reel supporting member having a longitudinal passage extending therethrough, a crank shaft rotatably engaged in said passage having at its lower end an outwardly extending crank arm and having at its upper end an outwardly extending crank arm having an upwardly extending finger at its outer end, the portion of said strip member in its looped position between said notch and said lip being in the path of movement of said finger of said upper crank arm whereby upon rotation of said crank shaft in one direction said notch of said strip member is disengaged from its intermediate portion, and a projecting lug carried by said reel adapted upon rotation of said reel to engage said lower crank arm of said crank shaft to rotate the latter.

RAYMOND N. BAUGH.
ROBERT F. WYCINOWSKI.

REFERENCES CITED

The following references are of record in the file of this patent:

UNITED STATES PATENTS

| Number | Name | Date |
| --- | --- | --- |
| D. 100,600 | Luff | July 28, 1936 |
| 1,741,253 | Skelton et al. | Dec. 31, 1929 |
| 1,803,914 | Oberg | May 5, 1931 |
| 2,122,841 | Laurila | July 5, 1938 |
| 2,283,233 | Schafer | May 19, 1942 |